United States Patent
Woodburn

(10) Patent No.: US 10,833,605 B2
(45) Date of Patent: Nov. 10, 2020

(54) SPACE VECTOR MODULATION IN AEROSPACE APPLICATIONS

(71) Applicant: GE Aviation Systems LLC, Grand Rapids, MI (US)

(72) Inventor: David Andrew Woodburn, Beavercreek, OH (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 431 days.

(21) Appl. No.: 15/840,045

(22) Filed: Dec. 13, 2017

(65) Prior Publication Data

US 2018/0175627 A1 Jun. 21, 2018

Related U.S. Application Data

(60) Provisional application No. 62/435,276, filed on Dec. 16, 2016.

(51) Int. Cl.
*H02M 7/5387* (2007.01)
*B64D 33/00* (2006.01)
(Continued)

(52) U.S. Cl.
CPC ........... *H02M 7/53871* (2013.01); *H02J 3/00* (2013.01); *B64D 33/00* (2013.01);
(Continued)

(58) Field of Classification Search
CPC ......... H02M 7/53871; H02M 7/53873; H02M 2007/53876; H02M 2001/0054;
(Continued)

(56) References Cited

U.S. PATENT DOCUMENTS

| 5,757,636 A | 5/1998 | Fletcher |
| 6,023,417 A | 2/2000 | Hava et al. |

(Continued)

FOREIGN PATENT DOCUMENTS

| CN | 104410311 A | 3/2015 |
| EP | 1947761 A1 | 7/2008 |

(Continued)

OTHER PUBLICATIONS

International Search Report Corresponding to Application No. PCT/US2017/066334 dated Mar. 30, 2018.

(Continued)

*Primary Examiner* — Fred E Finch, III
(74) *Attorney, Agent, or Firm* — Dority & Manning, P.A.

(57) ABSTRACT

Systems and methods for reducing switching losses in an electrical system in an aircraft are provided. In one example implementation, a method can include receiving DC power at an inverter of an electrical power system of an aircraft. The inverter can be a multiphase inverter having at least one bridge circuit for each output phase of the inverter. Each bridge circuit can include a plurality of switching elements. The method can include generating, by one or more control devices, a plurality of duty cycle commands for operation of the plurality of switching elements for each bridge circuit. The method can include operating, by the one or more control devices, the inverter in accordance with the plurality of duty cycle commands to generate a multiphase AC power output from the inverter. The plurality of duty cycle commands can be generated at least in part using a space vector modulation process.

18 Claims, 8 Drawing Sheets

(51) Int. Cl.
*H02J 3/00* (2006.01)
*H02M 1/00* (2006.01)

(52) U.S. Cl.
CPC ....... *B64D 2221/00* (2013.01); *H02J 2310/44* (2020.01); *H02M 2001/0054* (2013.01); *H02M 2007/53876* (2013.01)

(58) Field of Classification Search
CPC .... H02J 3/00; H02J 2310/44; B64D 2221/00; B64D 33/00
See application file for complete search history.

(56) References Cited

U.S. PATENT DOCUMENTS

| | | | |
|---|---|---|---|
| 7,391,181 | B2 | 6/2008 | Welchko et al. |
| 7,411,801 | B2 | 8/2008 | Welchko et al. |
| 7,432,683 | B2 | 10/2008 | Welchko et al. |
| 7,471,526 | B2 | 12/2008 | Welchko et al. |
| 7,616,466 | B2 | 11/2009 | Chakrabarti et al. |
| 7,679,310 | B2 | 3/2010 | Schulz et al. |
| 7,791,304 | B2 | 9/2010 | Pirozzi et al. |
| 8,054,032 | B2 | 11/2011 | Chakrabarti et al. |
| 8,115,433 | B2 | 2/2012 | Welchko |
| 8,269,434 | B2 | 9/2012 | Welchko et al. |
| 8,503,207 | B2 | 8/2013 | Tallam et al. |
| 9,236,828 | B1 | 1/2016 | Wei et al. |
| 9,369,071 | B2 | 6/2016 | Wang et al. |
| 9,537,426 | B2 | 1/2017 | Damson et al. |
| 10,158,299 | B1* | 12/2018 | Wei .......... H02M 1/12 |
| 2007/0133242 | A1* | 6/2007 | Welchko ........... H02M 7/53871 363/131 |
| 2007/0216341 | A1* | 9/2007 | Gataric ................... H02P 27/12 318/807 |
| 2007/0216344 | A1* | 9/2007 | Welchko ................. H02P 27/04 318/811 |
| 2008/0197902 | A1* | 8/2008 | Welchko ................. H02P 27/06 327/175 |
| 2009/0069142 | A1* | 3/2009 | Welchko .................... F16H 3/66 475/276 |
| 2009/0179608 | A1* | 7/2009 | Welchko ........... H02M 7/53875 318/801 |
| 2012/0201056 | A1 | 8/2012 | Wei et al. |
| 2013/0264974 | A1* | 10/2013 | Suzuki .................... H02P 27/08 318/139 |
| 2015/0032311 | A1 | 1/2015 | Shao et al. |
| 2016/0006367 | A1* | 1/2016 | Wei .................... H02M 7/53875 363/131 |
| 2016/0308406 | A1 | 10/2016 | Kitora |
| 2016/0311645 | A1* | 10/2016 | Agirman ................. H02P 27/08 |
| 2016/0315558 | A1* | 10/2016 | Lee ........................ H02M 7/537 |
| 2018/0019692 | A1* | 1/2018 | Tatiyosyan ............ G01R 23/155 |
| 2018/0034385 | A1* | 2/2018 | Huang ........................ H02J 5/00 |
| 2018/0062551 | A1* | 3/2018 | Moon ..................... H02P 21/24 |
| 2018/0152123 | A1* | 5/2018 | Zhang ............... H02M 7/53873 |
| 2018/0159449 | A1* | 6/2018 | Wangemann ........... H02P 6/182 |
| 2019/0058434 | A1* | 2/2019 | Yu ....................... G01R 19/1659 |

FOREIGN PATENT DOCUMENTS

| | | | |
|---|---|---|---|
| JP | 2015/524248 A | 8/2015 | |
| WO | WO-2016133502 A1 * | 8/2016 | ............. H02P 21/50 |
| WO | WO2016/141114 A | 9/2016 | |

OTHER PUBLICATIONS

European Search Report Corresponding to Application No. 17881929 dated Jul. 7, 2020.

* cited by examiner

SPACE VECTOR MODULATION IN AEROSPACE APPLICATIONS

PRIORITY CLAIM

The present application claims the benefit of priority of U.S. Provisional Patent Application No. 62/435,276, entitled "DISCONTINUOUS PULSE-WIDTH MODULATION IN AEROSPACE APPLICATIONS," filed Dec. 16, 2016, which is incorporated herein by reference for all purposes.

FIELD

The present subject matter relates generally to electrical power systems for use with aircraft or other aerospace applications.

BACKGROUND

Aircraft or other aerial vehicles can include electrical power systems for the generation of electrical power for various loads included as part of the aircraft. Some electrical power systems can include electrical machines, such as electric motors and/or electric generators, for the generation of electricity. In the aircraft industry, it is common to find combination motors/generators, where a motor is used to power a generator, and, depending on the configuration, the motor functions as a generator too. Regardless of the configuration, generators typically include a rotor having main windings that are driven to rotate by a source of rotation, such as an electrical or mechanical machine, which for some aircraft may be a gas turbine engine. In some applications, the generators initially generate alternating current (AC), which is rectified to generate direct current (DC) power for DC components on the aircraft.

Some electrical power systems can include inverters for generating multiphase AC power (e.g., three-phase AC power) from, for instance, DC power. The AC power can power various components of the aircraft and/or can be used as part of a backup AC power system for the aircraft. The inverter can include one or more bridge circuits for each phase of output power. Each bridge circuit can include a plurality of switching elements (e.g. insulated gate bipolar transistors, power MOSFETs, etc.).

BRIEF DESCRIPTION

Aspects and advantages of embodiments of the present disclosure will be set forth in part in the following description, or may be learned from the description, or may be learned through practice of the embodiments.

One example aspect of the present disclosure is directed to a method of providing AC power in an electrical power system of an aircraft. The method can include receiving DC power at an inverter of an electrical power system of an aircraft. The inverter can be a multiphase inverter having at least one bridge circuit for each output phase of the inverter. Each bridge circuit can include a plurality of switching elements. The method can include generating, by one or more control devices, a plurality of duty cycle commands for operation of the plurality of switching elements for each bridge circuit. The method can include operating, by the one or more control devices, the inverter in accordance with the plurality of duty cycle commands to generate a multiphase AC power output from the inverter. The plurality of duty cycle commands can be generated at least in part using a space vector modulation process.

Another example aspect of the present disclosure is directed to a power system for an aircraft. The system includes a DC power source and a multiphase inverter. The inverter can be configured to convert DC power from the DC power source to a multiphase AC power output for one or more aircraft loads. The inverter can have a bridge circuit for each output phase of the inverter. Each bridge circuit can include a plurality of switching elements. The system can include a control system configured to: generate a plurality of duty cycle commands for operation of the plurality of switching elements for each bridge circuit. The control system can be configured to control the inverter in accordance with the plurality of duty cycle commands to generate a multiphase AC power output from the inverter. When a power demand of the aircraft load(s) satisfies one or more thresholds, the plurality of duty cycle commands can be generated at least in part using a first modulation process. However, when the power demand does not satisfy the one or more thresholds, the plurality of duty cycle commands can be generated at least in part using a second modulation process that is different than the first modulation process.

Yet another example aspect of the present disclosure is directed to an aircraft. The aircraft can include a multiphase inverter configured to convert DC power to a multiphase AC power output for one or more aircraft loads. The aircraft can include a control system configured to generate a plurality of duty cycle commands for operation of the plurality of switching elements for each bridge circuit. The control system can be further configured to control the inverter in accordance with the plurality of duty cycle commands to generate the multiphase AC power output. When a power demand of the one or more aircraft loads satisfies one or more thresholds, the plurality of duty cycle commands are generated at least in part using a discontinuous pulse width modulation process having a first upper duty cycle limit and a first lower duty cycle limit. When the power demand does not satisfy the one or more thresholds, the plurality of duty cycle commands can be generated at least in part using a discontinuous modulation process having a second upper duty cycle limit and a second lower duty cycle limit. In particular, the first upper duty cycle limit is greater than the second upper duty cycle limit, and the first lower duty cycle limit is less than the second lower duty cycle limit.

In some embodiments, the space vector modulation process can include accessing a plurality of duty cycle commands. Each duty cycle command can be associated with one of the plurality of output phases of the multiphase inverter. The space vector modulation process can include for a first cycle, implementing a push-up process for the plurality of duty cycles; and for a second cycle, implementing a pull-down process for the plurality of duty cycles. The push-up process can include: determining a maximum of the plurality of duty cycle commands; determining a first difference between the maximum of the plurality of duty cycle commands and an upper duty cycle limit; and adding the first difference to each of the plurality of duty cycles such that the maximum of the plurality of duty cycles is equal to the upper duty cycle limit. The pull-down process can include: determining a minimum of the plurality of duty cycle commands; determining a second difference between the minimum of the plurality of duty cycle commands and a lower duty cycle limit; and subtracting the second difference from each of the plurality of duty cycles such that the minimum of the plurality of duty cycles is equal to the lower duty cycle limit.

Other example aspects of the present disclosure are directed to systems, methods, aircrafts, devices, non-transitory computer-readable media. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
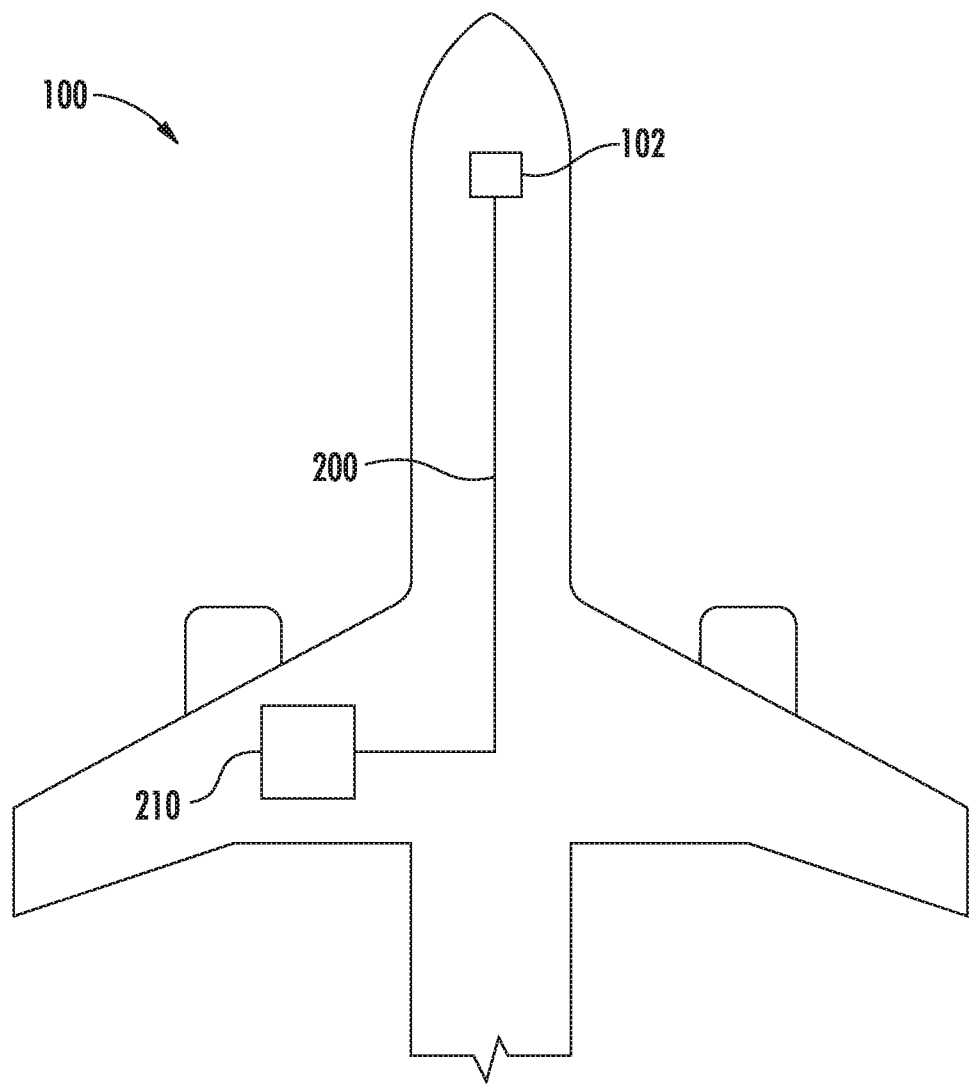
FIG. 1 depicts an example aircraft in accordance with example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to reducing switching losses in a multiphase inverter used as part of an electrical power system for an aircraft. The inverter can be configured to provide a multiphase AC power from a DC power source (e.g., DC power on a DC link). In some embodiments, the inverter can be used, for instance, as a backup power source or other power source for the aircraft.

The inverter can include a plurality of bridge circuits. Each of the plurality of bridge circuits can include a plurality of switching elements coupled in series. The switching elements can be switched according to a pulse-width modulation scheme to generate multiphase AC power from the DC power source. Example aspects of the present disclosure will be discussed with reference to generating three-phase AC power using an inverter. Those of ordinary skill in the art, using the disclosures provided herein, will understand that example aspects of the present disclosure are applicable to any inverter configured to provide a multiphase output.

According to example embodiments of the present disclosure, the inverter can be operated using a space vector modulation scheme. For example, the space vector modulation scheme can receive duty cycles of a regular PWM scheme and can modify the duty cycles of the PWM scheme. In one embodiment, the space vector modification scheme can modify the duty cycles using at least one of a discontinuous pulse width modulation (DPWM) process, a continuous space vector modulation (CSVM) process, a variable DPWM process, or a selective harmonic elimination (SHE) process.

In some embodiments, for a three-phase inverter, the space vector modulation scheme can include, in a cyclical sequence: accessing all three duty cycles for the three-phase inverter; alternately selecting a maximum of the three duty cycles or a minimum of the three duty cycles. When taking the maximum of the three duty cycles, the process can include adding a difference between one and the maximum duty cycle to all three duty cycles, thereby pushing up all three duty cycles equally and making the maximum duty cycle equal to one. When taking the minimum of the three duty cycles, the process can include subtracting a difference between the minimum duty cycle and zero from each of the three duty cycles, thereby pulling down all three duty cycles equally and making the minimum duty cycle equal to zero. This push-up and pull-down cycle can be in phase with a fundamental frequency of the original duty cycles so that, in general, the pull-up happens during a peak of a phase and a pull-down happens during a valley (e.g., trough) of a phase.

In some embodiments, values other than one and zero may be used for the upper and lower duty cycle limits, respectively. For example, a basic DPWM pattern can be used over a range of load values. However, a value less than one may be used for the upper duty cycle limit in some examples. Further, values greater than zero may be used for the lower duty cycle limit in some examples.

In some embodiments, a continuous space vector modulation (CSVM) scheme is used. In one example the median of the three duty cycles can be set to be 0.5 for each moment.

In some embodiments, a variable pulse width modulation scheme can be used. For example, CSVM can be used at lighter loads or lower modulation indices and DPWM can be used at heavier loads or higher modulation indices. In some examples, the inverter can operate in a CSVM mode and transition to a DPWM mode when the load exceeds an upper threshold. The inverter can transition back to CSVM mode when the load falls below a lower threshold that is less than the upper threshold. In some examples, this type of hysteresis prevents rapidly switching back and forth between modulation schemes.

In some embodiments, a variable DPWM scheme can be used. For example, variable duty cycle limits may be used in some instances. For example, as the load or modulation index increases, the upper and/or lower duty cycle limits can change. For instance, the upper duty cycle limit may move closer to one and the lower duty cycle limit may be closer to zero as the load or modulation index increases Operating an inverter according to a space vector modulation scheme according to example aspects of the present disclosure can provide a number of technical effects and benefits. For instance, use of a space vector modulation scheme can increase a modulation index, meaning that for a same DC input power of the inverter (e.g., a same DC link voltage) a space vector modulation scheme can create a higher voltage output when compared to regular PWM schemes.

In addition, because there is always one phase during a DPWM process whose duty cycle is either at the maximum or the minimum, there is always one leg (e.g., bridge circuit) that is not switching. As a result, in terms of thermal behavior, the effective switching frequency can be dropped to 66% of the normal switching frequency when the DPWM process is used. The switching losses and heat can be reduced by 33%. Moreover, because the three duty cycles are moved by the same amount during DPWM, the original duty cycles are only modified by a common-mode signal: there is no differential-mode distortion and the actual switching frequency has not dropped.

In this way, the systems and methods according to example aspects of the present disclosure provide an improvement to an electrical power system of an aircraft by providing for the capability of increasing a maximum allowable modulation index by about 15%, decreasing switching losses by about 33%, not affecting an actual switching frequency, and reducing common-mode noise at lighter loads. These percentages are provided by way of example only. It will be appreciated that implementations of the disclosed technology may result in different maximum allowable modulation indices and/or switching losses.

FIG. 1 depicts an example aircraft 100 in accordance with example embodiments of the present disclosure. The aircraft 100 can include a control system 102, such as the control system 600 described with reference to FIG. 6. The aircraft 100 can include an electrical power system 200. The electrical power system 200 can be used to power one or more loads on the aircraft 200.

In some embodiments, the electrical power system 200 can include one or more electrical machines 210 that can be used to generate power. The electrical machine(s) 210 can provide an AC output. The AC output can be converted to a DC power for a DC link by, for instance, a power converter (e.g., a rectifier, AC to DC converter, etc.). The DC power on the DC link can be converted to AC power for one or more aircraft loads by a multiphase inverter (e.g., a three-phase inverter). According to example aspects of the present disclosure, the inverter can be controlled according to a space vector modulation process to reduce switching losses and increase a maximum allowable modulation index for the inverter.

The numbers, locations, and/or orientations of the components of example aircraft 200 are for purposes of illustration and discussion and are not intended to be limiting. Those of ordinary skill in the art, using the disclosures provided herein, shall understand that the numbers, locations, and/or orientations of the components of the aircraft 200 can be adjusted without deviating from the scope of the present disclosure.

Figure 2:
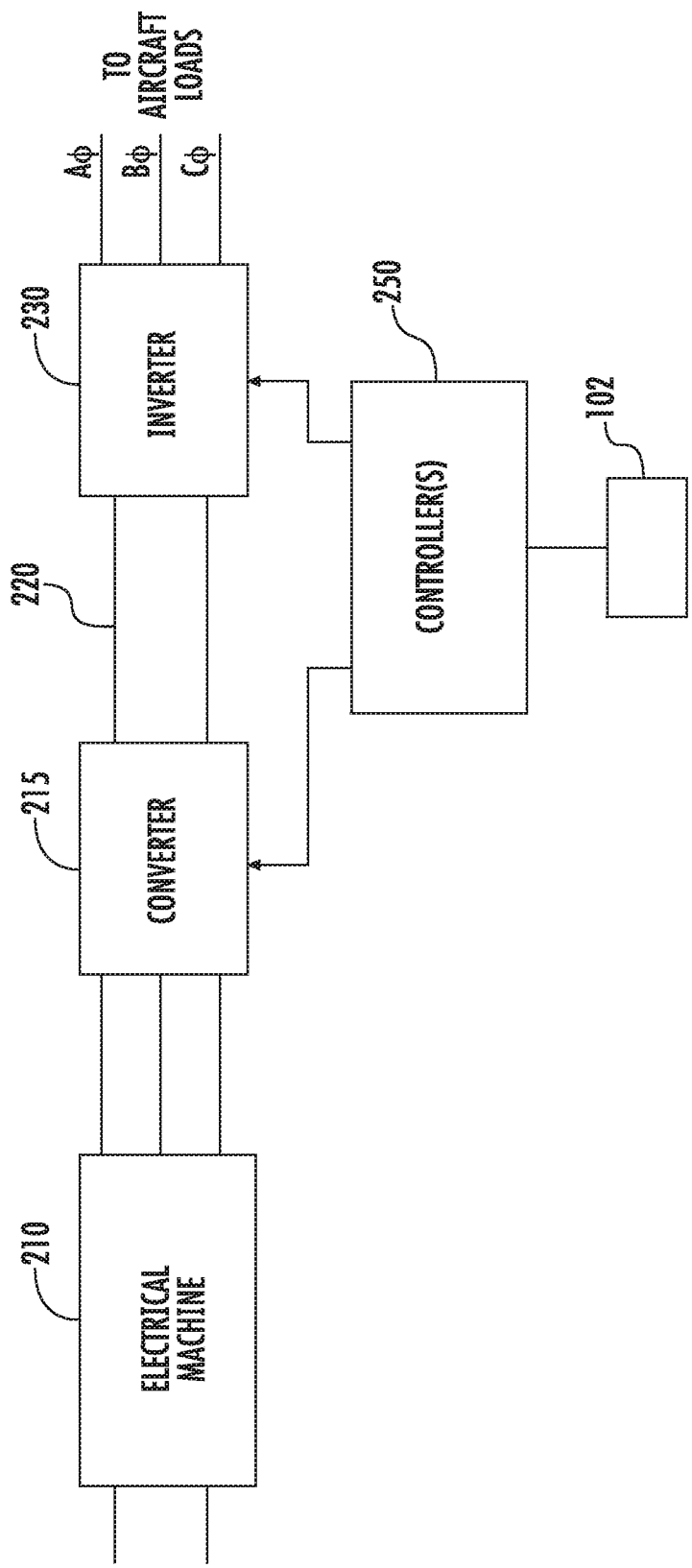
FIG. 2 depicts an example aircraft power system in accordance with example embodiments of the present disclosure.

FIG. 2 depicts an example circuit diagram of at least a portion of an example power system 200 according to example embodiments of the present disclosure. As shown, the electrical power system 200 includes an electrical machine 210 (e.g., a generator) configured to generate AC power from a rotational movement of a shaft. In some embodiments, the electrical machine 210 can include a first machine (e.g., an exciter) and a second machine (e.g., a main machine). The electrical machine 210 can be coupled to an axial source of rotation (not shown), which may be a gas turbine engine of an aircraft.

The electrical machine 210 can generate an AC power output. The AC power output can be provided to converter 215 which can be configured to convert the AC power to a DC power for DC link 220. The converter 215 can include any suitable circuit for converting AC power to DC power. For instance, in some embodiments, the converter 215 can be a rectifier (e.g., a bridge rectifier). In some embodiments, the converter 215 can be an AC to DC converter.

The DC power on the DC link 220 can be a DC power source for an inverter 230. The inverter 230 can be a multiphase inverter configured to convert the DC power to an output multiphase AC power. In the example of FIG. 2, the inverter 230 is a three-phase inverter configured to provide an output Aϕ, an output Bϕ and an output Cϕ.

Figure 3:
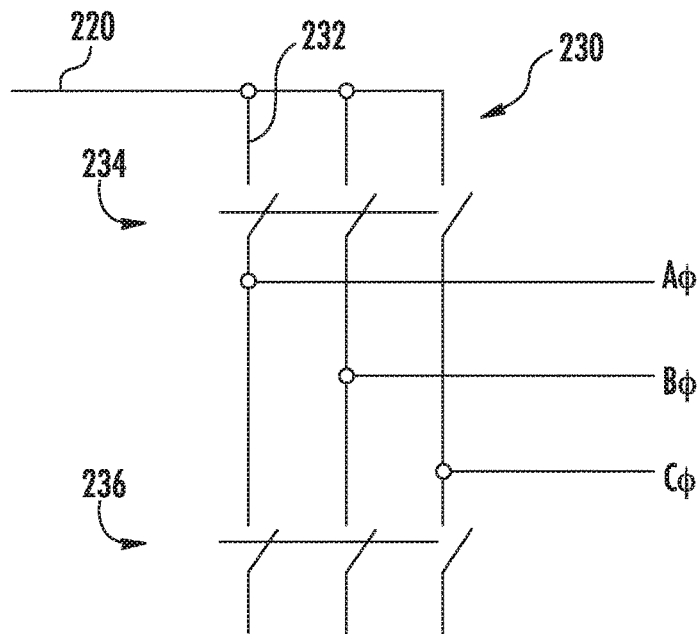
FIG. 3 depicts an example inverter in accordance with example embodiments of the present disclosure.

FIG. 3 depicts a circuit diagram of an example inverter 230. The inverter 230 includes a plurality of bridge circuits 232. Each bridge circuit 232 includes a plurality of switching elements, including an upper switching element 234 and a lower switching element 236 coupled in series. The switching elements can be, for instance, insulated gate bipolar transistors, power MOSFETS, or other switching elements. The switching elements can be coupled, in some embodiments, with anti-parallel diodes. Each bridge circuit 232 can be associated with an output phase of the inverter 230. The output for each bridge circuit 232 can be coupled at a node between the upper switching element 234 and the lower switching element 236. In traditional power systems for aircraft, the upper and lower switching elements 234, 236 are switched according to a pulse width modulation (PWM) scheme to generate the multiphase AC power. However, the switching of the upper and lower switching elements 234, 236 leads to switching losses, and heat from the switching losses can cause an additional burden on a cooling system for the aircraft. As discussed in detail below, the switching elements 234, 236 can be operated in accordance with a space vector modulation scheme to reduce switching losses.

Figure 9:
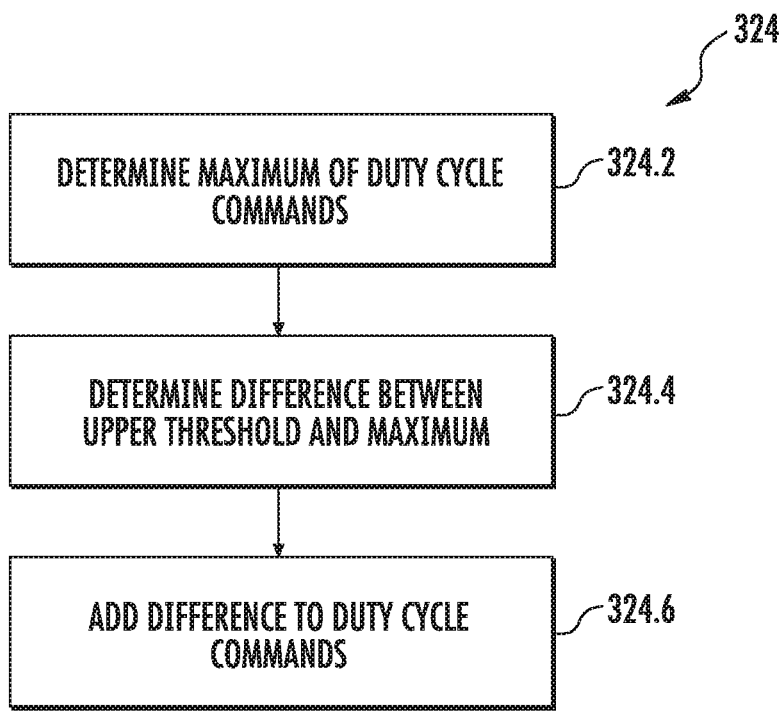
FIG. 9 depicts an example push-up process according to example embodiments of the present disclosure.

Referring back to FIG. 2, the power system 200 can include one or more control devices 250 for controlling operation of the inverter 230. The control devices 250 can be any suitable controller or other control system (e.g., microcontroller, microprocessor, application specific integrated circuit, etc.) configured to perform the operations described herein. An example control system is illustrated in FIG. 9. In some embodiments, the one or more control devices 250 can control the inverter 230 according to a space vector modulation process to reduce switching losses and increase a maximum allowable modulation index of the inverter 230.

Figure 4:
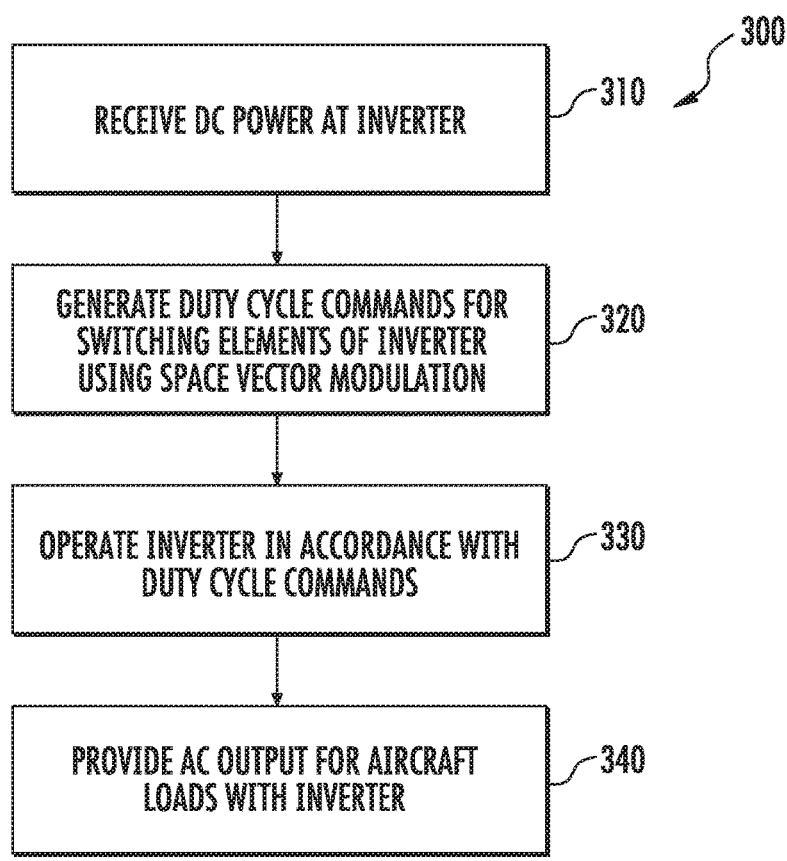
FIG. 4 depicts a flow diagram of an example method according to example embodiments of the present disclosure.

FIG. 4 depicts a flow diagram of an example method 300 according to example embodiments of the present disclosure. The method 300 can be implemented using, for instance, the power system 200 of FIG. 2 or other suitable power system. FIG. 4 depicts steps performed in a particular order for purposes of illustration and discussion. Those of ordinary skill in the art, using the disclosures provided herein, will understand that various steps of any of the methods disclosed herein can be adapted, modified, performed concurrently, omitted, rearranged, and/or expanded in various ways without deviating from the scope of the present disclosure.

At (310), the method includes receiving DC power at an inverter of an aircraft power system. For instance, DC power from a DC link can be received as an input to a multiphase inverter of an aircraft power system. The inverter can include at least one bridge circuit for each output phase of the inverter. Each bridge circuit can include a plurality of switching elements (e.g., as discussed with reference to FIG. 3).

At (320), the method includes generating duty cycle commands for operation of the plurality of switching elements for each bridge circuit of the inverter. According to example embodiments, the duty cycle commands are generated at least in part using a space vector modulation process.

Figure 5:
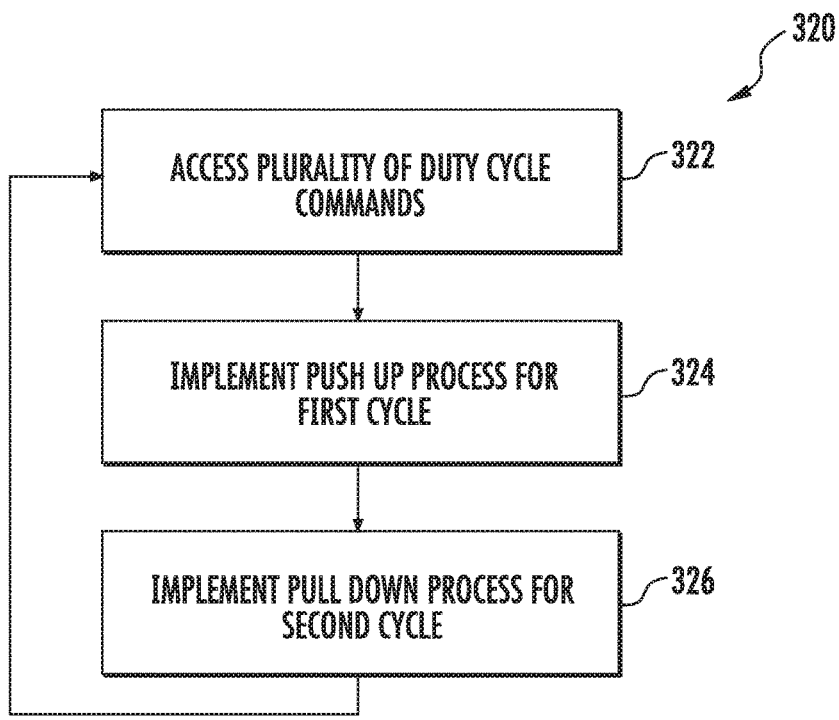
FIG. 5 depicts an example space vector modulation scheme according to example embodiments of the present disclosure.
Figure 6:
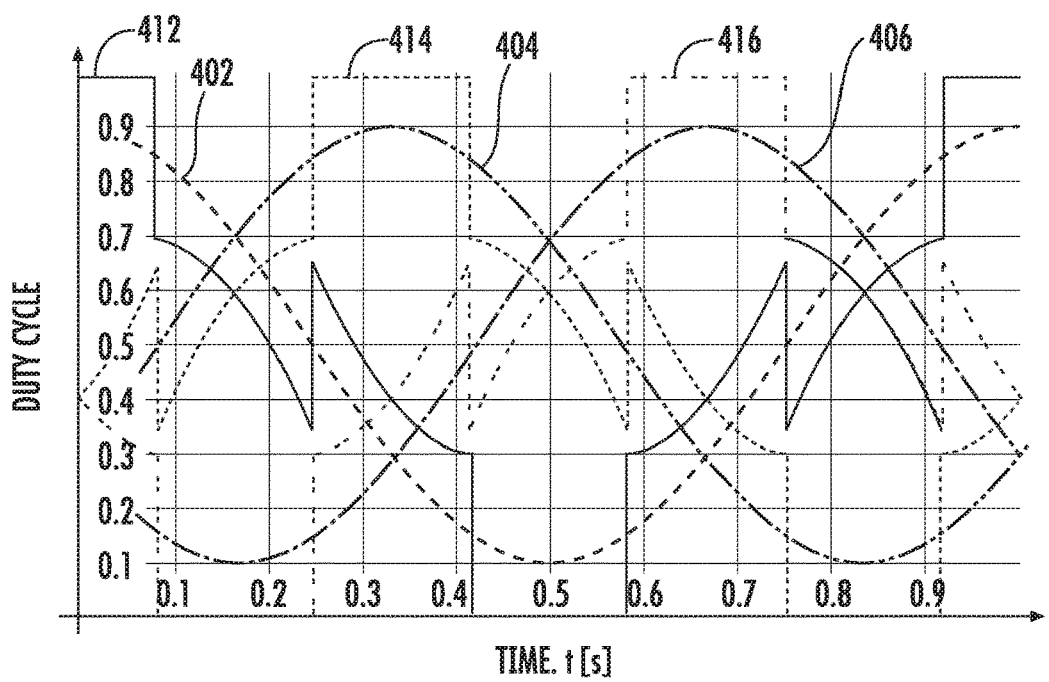
FIG. 6 depicts a graphical representation of duty cycle commands generated using a discontinuous pulse-width modulation in accordance with example embodiments process of the present disclosure.

FIG. 5 depicts a flow diagram of a space vector modulation process according to example embodiments of the present disclosure. At (322), the space vector modulation process includes accessing a plurality of duty cycle commands. The duty cycle commands can be generated to using standard PWM to provide a multiphase output of the inverter. For instance, FIG. 6 depicts a graphical representation of duty cycle commands 402, 404, and 406 for operation of switching elements in bridge circuits associated with an output Aϕ, Bϕ and Cϕ, respectively.

At (324), the space vector modulation process includes implementing a push-up process for a push-up cycle. The push-up process provides that the switching elements for at least one of the output phases is not switched during the push-up cycle.

An example push-up process (324) is illustrated in FIG. 9. As shown, the push-up process (324) can include: determining a maximum of the duty cycle commands (324.2); determining a difference between an upper duty cycle limit and the maximum (324.4); and adding the difference to the duty cycle commands (324.6). In example embodiments, the upper duty cycle limit is one hundred percent 100%.

At (326) of FIG. 5, the space vector modulation process includes implementing a pull-down process for a second cycle. The pull-down process provides that the switching elements for at least one of the output phases is not switched during the pull-down cycle.

Figure 10:
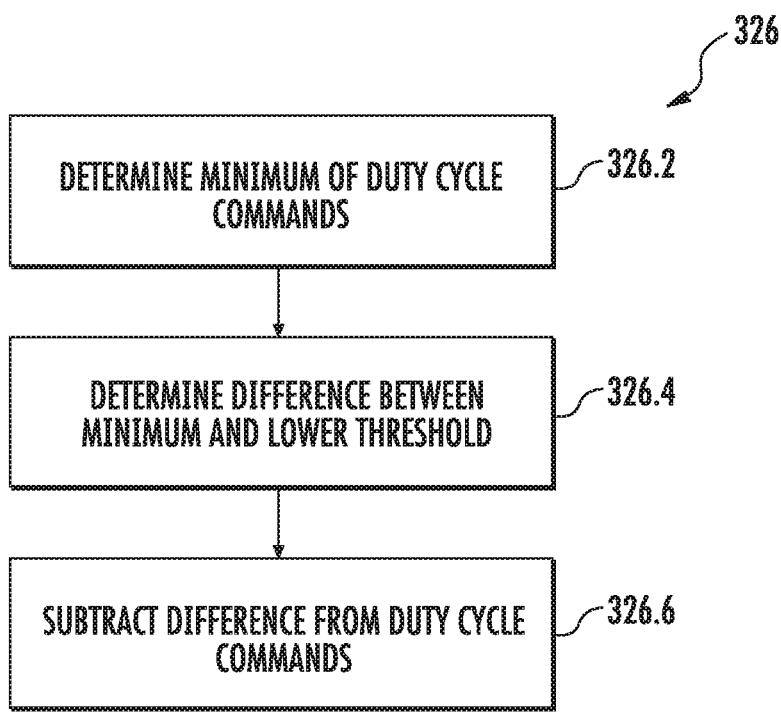
FIG. 10 depicts an example pull-down process according to example embodiments of the present disclosure.

An example pull-down process (326) is illustrated in FIG. 10. As shown, the pull-down process (326) can include: determining a minimum of the duty cycle commands (326.2); determining a difference between a lower threshold and the minimum (326.4); and subtracting the difference from the duty cycle commands (326.6). In example embodiments, the lower threshold corresponds to a duty cycle of 0%.

Referring to FIG. 5, the push-up process for the push-up cycle and the pull-down process for the pull-down cycle can be alternately implemented during the space vector modulation process. FIG. 6 depicts a graphical representation of the duty cycle commands 412, 414, and 416 generated using a DPWM process according to example aspects of the present disclosure for operation of switching elements in bridge circuits associated with an output Aϕ, Bϕ and Cϕ, respectively. For a DPWM process in one example, the upper and lower thresholds correspond to a duty cycle of 100% and 0%, respectively. As a result, there may always be one leg that is not switching, because there is one phase (e.g., Aϕ, Bϕ and Cϕ whose duty cycle is either 0% or 100% during a given time period. In this manner, the switching losses and heat can be reduced, because the effective switching frequency of the inverter is reduced relative to the normal switching frequency of the inverter.

Other space vector modulation processes may be used to modify the duty cycle commands 412, 414 and 416. For example, when a power demand of one or more aircraft loads receiving AC power from the inverter is less than a threshold amount, discontinuities in the duty cycle commands 412, 414 and 416 may be greater compared to discontinuities in the duty cycle commands 412, 414 and 416 when the power demand is less than the threshold amount. Furthermore, since an amount of noise associated with the common-mode signal increases as discontinuities in the duty cycle commands 412, 414 and 416 increase, the amount of noise associated with the common-mode signal may be greater when the power demand is less than the threshold amount. For this reason, other space vector modulation processes may be used to modify the duty cycle commands 412, 414 and 416 when the power demand is less than the threshold amount.

Figure 7:
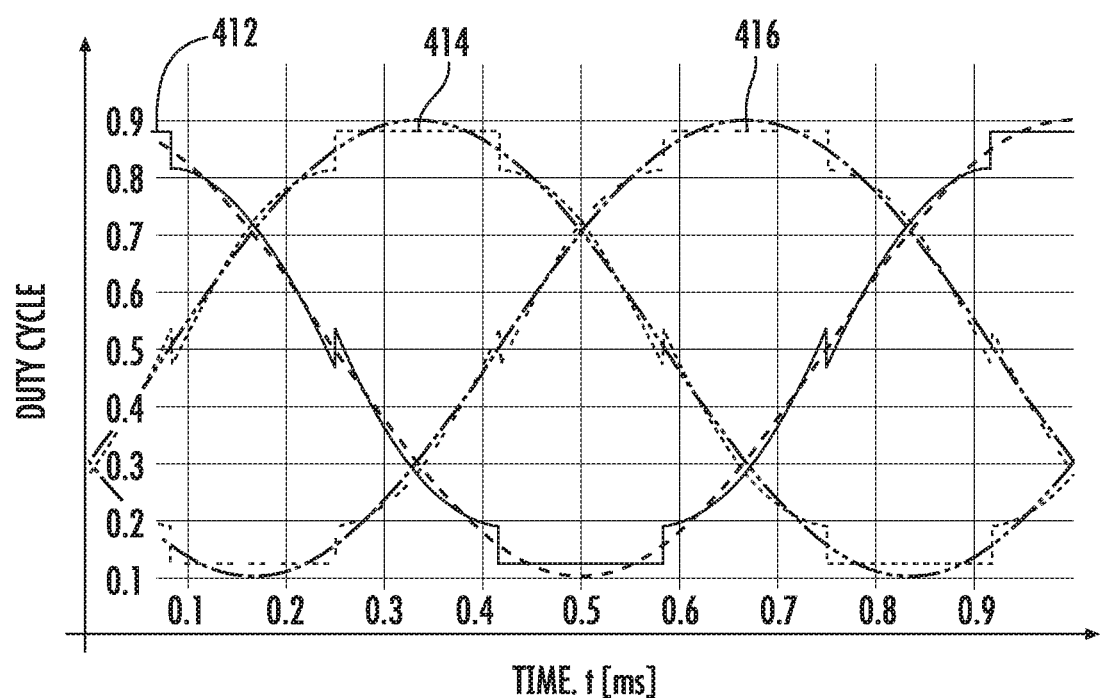
FIG. 7 depicts a graphical representation of duty cycle commands generated using a variable discontinuous pulse-width modulation process in accordance with example embodiments process of the present disclosure.

FIG. 7 depicts a graphical representation of duty cycle commands 412, 414 and 416 generated using a variable DPWM process according to example aspects of the present disclosure. In contrast to the DPWM process, the variable DPWM process includes adjusting the upper and lower duty cycle limits based on the power demand of the one or more aircraft loads. For example, when the power demand satisfies one or more thresholds, the duty cycle commands 412, 414 and 416 can be generated using a DPWM process having a first upper duty cycle limit and a first lower duty cycle limit. However, when the power demand does not satisfy the one or more thresholds, the duty cycle commands 412, 414, and 416 can be generated using a DPWM process having a second upper duty cycle limit and a second lower duty cycle limit. In example embodiments, the first upper duty cycle limit can be greater than the second upper duty cycle limit, and the first lower duty cycle limit can be less than the second lower duty cycle limit. In particular, the first upper duty cycle limit can be one hundred percent (100%), the lower duty cycle limit can be zero percent (0%), the second upper duty cycle limit can be greater than fifty percent (50%) but less than 100%, and the second lower duty cycle limit can be greater than 0% but less than 50%. In this manner, discontinuities in the duty cycle commands 412, 414 and 416 when the power demand is less than the threshold amount can be reduced.

Figure 8:
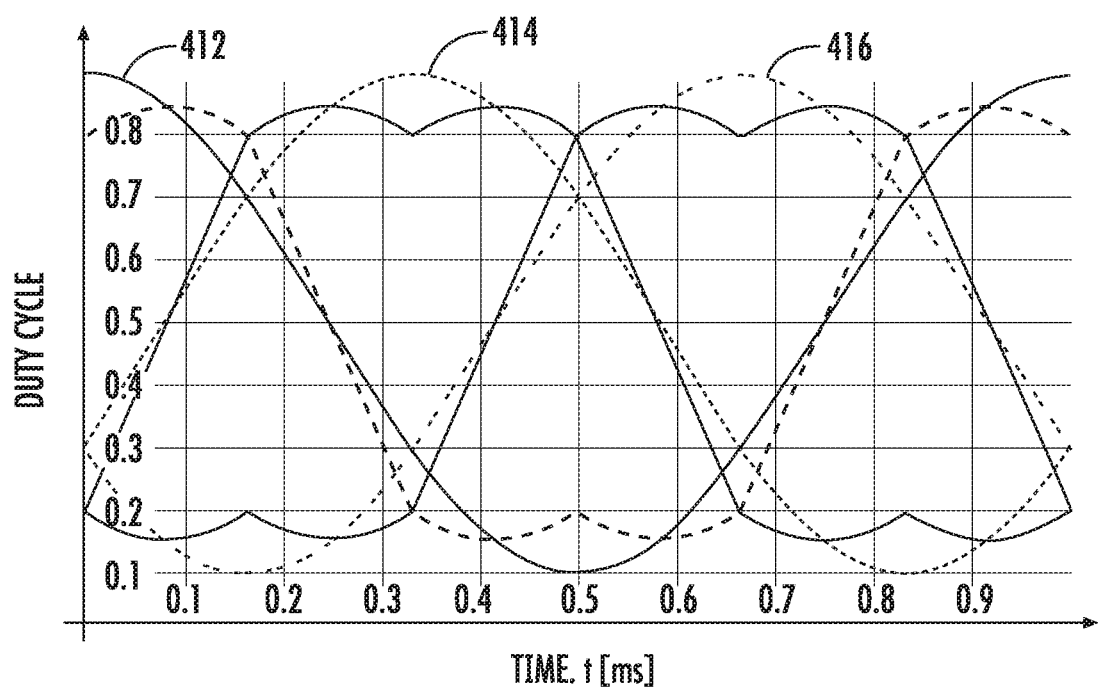
FIG. 8 depicts a graphical representation of duty cycle commands generated using a continuous space vector modulation process in accordance with example embodiments process of the present disclosure.

FIG. 8 depicts a graphical representation of duty cycle commands 412, 414 and 416 generated using a CSVM process according to example embodiments of the present disclosure. When the power demand of the one or more aircraft loads is less than the threshold amount, the CSVM process is preferred, because duty cycle commands 412, 414 and 416 that are modified using the CSVM process always have a duty cycle that is greater than 0% and less than 100%. As such, discontinuities in the duty cycle commands 412, 414 and 416 are reduced. Furthermore, since discontinuities are reduced, noise associated with the common-mode signal is reduced.

In some embodiments, the duty cycle commands can be generated at least in part using a first modulation process when the a power demand of the one or more aircraft loads satisfies one or more thresholds. Alternatively, the plurality of duty cycle commands can be generated at least in part using a second modulation process when the one or more aircraft loads do not satisfy the one or more thresholds. More specifically, the second modulation process can be different than the first modulation process. As an example, the first modulation process can be a DPWM process, and the second modulation process can be a CSVM process. In this manner, the inverter can switch between the DPWM process and the CSVM process based, at least in part, on the power demand of the one or more aircraft loads. It should be appreciated, however, that the inverter can be configured to switch between the DPWM and CSVM processes based on other parameters, such as the modulation index.

Referring back to FIG. 4, the method (300) can include operating the inverter in accordance with the modified duty cycle commands (330). For instance, gate timing signals can be provided to the switching elements in accordance with the modified duty cycle commands to operate the inverter in accordance with a DPWM scheme. At (340), the method (300) can include providing the AC output from the inverter for one or more aircraft loads.

Figure 11:
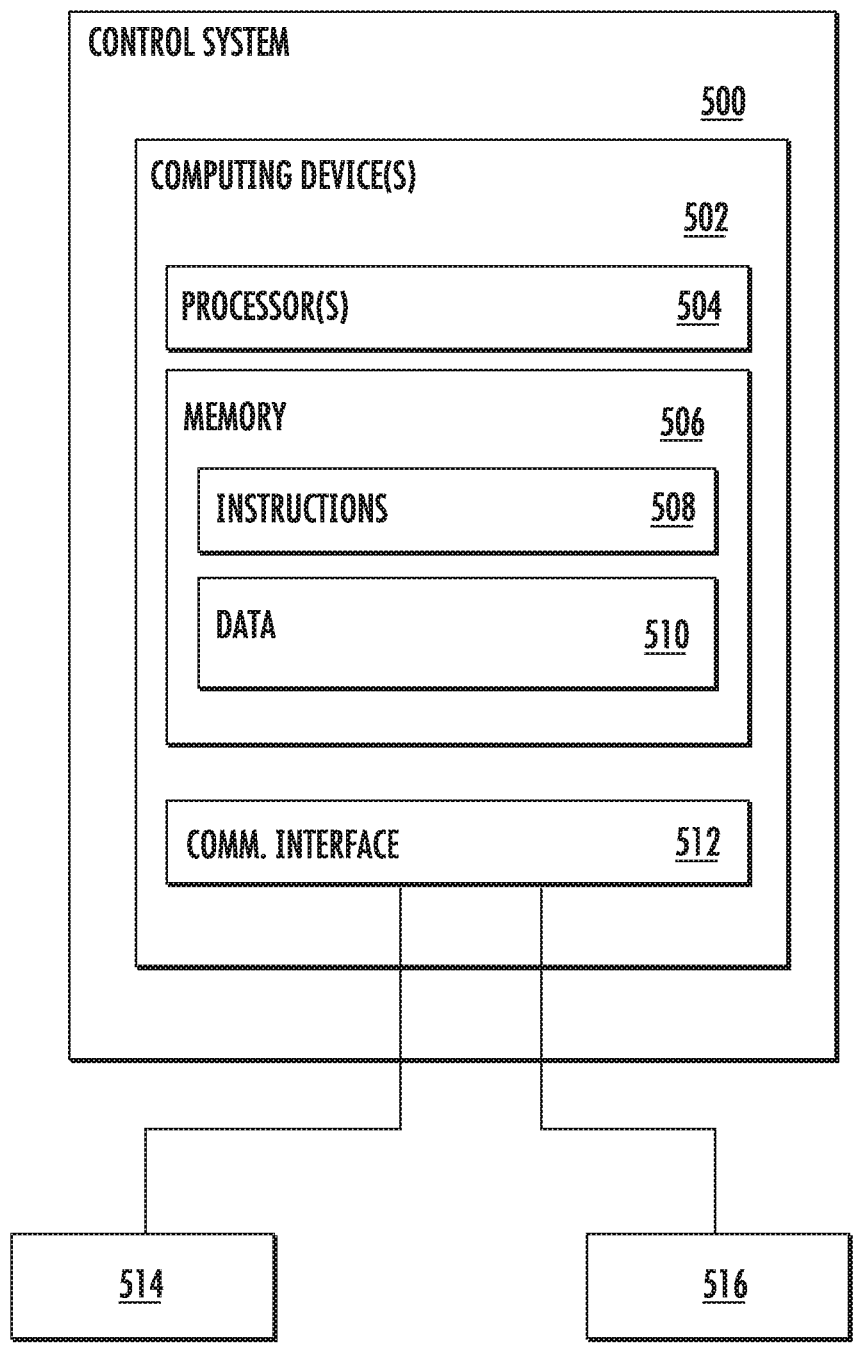
FIG. 11 depicts aspects of an example control system for implementing one or more aspects according to example embodiments of the present disclosure.

FIG. 11 depicts a block diagram of an example computing system that can be used to implement the control system 500 or other systems according to example embodiments of the present disclosure. As shown, the control system 500 can include one or more computing device(s) 502. The one or more computing device(s) 502 can include one or more processor(s) 504 and one or more memory device(s) 506. The one or more processor(s) 504 can include any suitable processing device, such as a microprocessor, microcontroller, integrated circuit, logic device, or other suitable processing device. The one or more memory device(s) 506 can include one or more computer-readable media, including, but not limited to, non-transitory computer-readable media, RAM, ROM, hard drives, flash drives, or other memory devices.

The one or more memory device(s) 506 can store information accessible by the one or more processor(s) 504, including computer-readable instructions 508 that can be executed by the one or more processor(s) 504. The instructions 508 can be any set of instructions that when executed by the one or more processor(s) 504, cause the one or more processor(s) 504 to perform operations. The instructions 508 can be software written in any suitable programming language or can be implemented in hardware. In some embodiments, the instructions 508 can be executed by the one or more processor(s) 504 to cause the one or more processor(s) 504 to perform operations, such as the operations for DPWM disclosed herein.

The memory device(s) 506 can further store data 510 that can be accessed by the processors 504. The data 510 can include one or more table(s), function(s), algorithm(s), model(s), equation(s), etc. for reducing switching losses in an electrical system in an aircraft according to example embodiments of the present disclosure.

The one or more computing device(s) 502 can also include a communication interface 512 used to communicate, for example, with the other components of the system and/or other computing devices. The communication interface 512 can include any suitable components for interfacing with one or more network(s), including for example, transmitters, receivers, ports, controllers, antennas, or other suitable components. The interface can communicate with, for instance, sensor(s) 514 and remote device(s) 516.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for providing AC power in an electrical power system of an aircraft, the method comprising:
   receiving DC power at a multiphase inverter of the electrical power system, the multiphase inverter having at least one bridge circuit for each output phase of the inverter, each bridge circuit comprising a plurality of switching elements;
   generating, by one or more control devices, a plurality of duty cycle commands for operation of the plurality of switching elements; and
   operating, by the one or more control devices, the multiphase inverter in accordance with the plurality of duty cycle commands to generate a multiphase AC power output for one or more aircraft loads;
   wherein the plurality of duty cycle commands are generated at least in part using a space vector modulation process, and wherein:
   in response to a power demand of the one or more aircraft loads that satisfies one or more thresholds, the plurality of duty cycle commands are generated at least in part using a discontinuous pulse width modulation process having a first upper duty cycle limit and a first lower duty cycle limit;
   in response to the power demand not satisfying the one or more thresholds, the plurality of duty cycle commands are generated at least in part using a discontinuous pulse width modulation process having a second upper duty cycle limit and a second lower duty cycle limit;
   the first upper duty cycle limit is greater than the second upper duty cycle limit; and
   the first lower duty cycle limit is less than the second lower duty cycle limit.

2. The method of claim 1, wherein the space vector modulation process comprises at least one of a discontinuous pulse width modulation process, a variable discontinuous pulse width modulation process, a continuous space vector modulation process, or a selective harmonic elimination process.

3. The method of claim 2, wherein the space vector modulation process comprises:
accessing, by the one or more control devices, a plurality of duty cycle commands, each duty cycle command of the plurality of duty cycle commands being associated with one of the plurality of output phases of the multiphase inverter;
for a push-up cycle, implementing a push-up process for the plurality of duty cycle commands; and
for a pull-down cycle, implementing a pull-down process for the plurality of duty cycle commands.

4. The method of claim 3, wherein the push-up process is implemented such that the plurality of switching elements of each bridge circuit are not switched during the push-up cycle.

5. The method of claim 4, wherein the push-up process comprises:
determining, by the one or more control devices, a maximum of the plurality of duty cycle commands;
determining, by the one or more control devices, a first difference between the maximum of the plurality of duty cycle commands and an upper duty cycle limit; and
adding, by the one or more control devices, the first difference to each of the plurality of duty cycle commands such that the maximum of the plurality of duty cycle commands is equal to the upper duty cycle limit.

6. The method of claim 5, wherein when the space vector modulation process includes the discontinuous pulse width modulation process, the upper duty cycle limit is one hundred (100%).

7. The method of claim 5, wherein when the space vector modulation process includes the variable discontinuous pulse width modulation process, the upper duty cycle limit is between fifty percent (50%) and one hundred percent (100%).

8. The method of claim 3, wherein the pull-down process is implemented such that the switching elements of each bridge circuit is not switched during the pull-down cycle.

9. The method of claim 8, wherein the pull-down process comprises:
determining, by the one or more control devices, a minimum of the plurality of duty cycle commands;
determining, by the one or more control devices, a second difference between the minimum of the plurality of duty cycle commands and a lower duty cycle limit; and
subtracting, by the one or more control devices, the second difference from each of the plurality of duty cycle commands such that the minimum of the plurality of duty cycles is equal to the lower duty cycle limit.

10. The method of claim 9, wherein when the space vector modulation process includes the discontinuous pulse width modulation process, the lower duty cycle limit is zero percent (0%).

11. The method of claim 9, wherein when the space vector modulation process includes the variable discontinuous pulse width modulation process, the lower duty cycle limit is a duty cycle between zero percent (0%) and fifty percent (50%).

12. The method of claim 3, wherein the push-up cycle and the pull-down cycle are implemented in phase with a fundamental frequency of a PWM cycle.

13. A power system for an aircraft, comprising:
a DC power source;
a multiphase inverter configured to convert DC power from the DC power source to AC power for one or more aircraft loads, the multiphase inverter having a bridge circuit for each output phase of a plurality of output phases of the multiphase inverter, each bridge circuit comprising a plurality of switching elements;
a control system configured to:
generate a plurality of duty cycle commands for operation of the plurality of switching elements for each bridge circuit;
control the inverter in accordance with the plurality of duty cycle commands to generate a multiphase AC power output;
wherein in response to a power demand of the one or more aircraft loads that satisfies one or more thresholds, the plurality of duty cycle commands are generated at least in part using a first modulation process, and
wherein in response to a power demand of the one or more aircraft loads that does not satisfy the one or more thresholds, the plurality of duty cycle commands are generated at least in part using a second modulation process, and wherein:
the first modulation process includes a discontinuous pulse width modulation process having a first upper duty cycle limit and a first lower duty cycle limit;
the second modulation process includes a discontinuous pulse width modulation process having a second upper duty cycle limit and a second lower duty cycle limit;
the first upper duty cycle limit is greater than the second upper duty cycle limit; and
the first lower duty cycle limit is less than the second lower duty cycle limit.

14. The power system of claim 13, wherein:
the first modulation process includes a discontinuous pulse width modulation process; and
the second modulation process includes a continuous space vector modulation process.

15. The power system of claim 14, wherein:
the one or more thresholds include a first threshold and a second threshold, the first threshold being greater than the second threshold;
in response to the power demand satisfying the first threshold, the plurality of duty cycle commands are generated at least in part using the discontinuous pulse width modulation process;
in response to the power demand not satisfying the second threshold, the plurality of duty cycle commands are generated at least in part using the continuous space vector modulation process.

16. An aircraft, comprising:
a multiphase inverter configured to convert DC power to a multiphase AC power for one or more aircraft loads, the inverter having at least one bridge circuit for each output phase of the multiphase inverter, each bridge circuit comprising a plurality of switching elements; and
a control system configured to:
in response to a power demand of the one or more aircraft loads that satisfies one or more thresholds, generate a first plurality of duty cycle commands for operation of the plurality of switching elements using a discontinuous pulse width modulation process having a first upper duty cycle limit and a first lower duty cycle limit;

in response to a power demand of the one or more aircraft loads that does not satisfy the one or more thresholds, generating a plurality of duty cycle commands using a discontinuous pulse width modulation process having a second upper duty cycle limit and a second lower duty cycle limit, the first upper duty cycle limit is greater than the second upper duty cycle limit, the first lower duty cycle limit is less than the second lower duty cycle limit;

control the inverter in accordance with the plurality of duty cycle commands to generate the multi-phase AC power output.

17. The aircraft of claim 16, wherein the first upper duty cycle limit is one hundred percent (100%), and the first lower duty cycle limit is zero percent (0%).

18. The aircraft of claim 16, wherein the second upper duty cycle limit is greater than fifty percent (50%), and the second lower duty cycle limit is less than fifty percent (50%).

* * * * *